(12) United States Patent
Tanaka et al.

(10) Patent No.: US 11,539,062 B2
(45) Date of Patent: Dec. 27, 2022

(54) FUEL CELL SYSTEM

(71) Applicant: TOYOTA JIDOSHA KABUSHIKI KAISHA, Toyota (JP)

(72) Inventors: Seiichi Tanaka, Nagoya (JP);
Nobukazu Mizuno, Nagakute (JP);
Kazuo Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 45 days.

(21) Appl. No.: 17/223,811

(22) Filed: Apr. 6, 2021

(65) Prior Publication Data
US 2021/0359319 A1    Nov. 18, 2021

(30) Foreign Application Priority Data
May 15, 2020   (JP) .............................. JP2020-085950

(51) Int. Cl.
*H01M 8/04* (2016.01)
*H01M 8/04746* (2016.01)
*H01M 8/04089* (2016.01)

(52) U.S. Cl.
CPC ... *H01M 8/04753* (2013.01); *H01M 8/04089* (2013.01); *H01M 2250/20* (2013.01)

(58) Field of Classification Search
CPC ......... H01M 8/04753; H01M 8/04089; H01M 2250/20

USPC ........................................................ 429/444
See application file for complete search history.

(56) References Cited

U.S. PATENT DOCUMENTS

| | | | |
|---|---|---|---|
| 2009/0029226 A1 | 1/2009 | Yamagishi et al. | |
| 2010/0239935 A1 | 9/2010 | Katano | |
| 2013/0052556 A1* | 2/2013 | Maier | H01M 8/04753 700/282 |
| 2014/0033801 A1* | 2/2014 | Sinha | H01M 8/04686 73/40 |
| 2017/0324106 A1* | 11/2017 | Sinha | H01M 8/04753 |

FOREIGN PATENT DOCUMENTS

| | | |
|---|---|---|
| JP | 2007194189 A | 8/2007 |
| JP | 2008146923 A | 6/2008 |

* cited by examiner

*Primary Examiner* — James M Erwin
(74) *Attorney, Agent, or Firm* — Dickinson Wright, PLLC

(57) ABSTRACT

A fuel cell system includes a fuel cell, a fuel gas supply channel, a regulator, an injector, and a controller. The controller drives the regulator in conjunction with the injector. The controller compares a fuel gas flow amount necessary for the fuel cell to generate electricity with a predetermined fuel gas flow amount, selects the fuel gas flow amount that is larger, and issues commands to the regulator and the injector. The predetermined fuel gas flow amount is set to be larger than the fuel gas flow amount necessary for the fuel cell to generate the electricity when a generated current or output of the fuel cell is smaller than a predetermined threshold value.

3 Claims, 3 Drawing Sheets

FUEL CELL SYSTEM

CROSS-REFERENCE TO RELATED APPLICATION

This application claims priority to Japanese Patent Application No. 2020-085950 filed on May 15, 2020, incorporated herein by reference in its entirety.

BACKGROUND

1. Technical Field

The disclosure relates to a fuel cell system.

2. Description of Related Art

In recent years, fuel cell vehicles, which are low-emission vehicles of which consideration for the environment is an object, have come into practical use. Fuel cell systems that generate electricity by supplying a fuel gas and an oxidizing gas thereto are installed in such fuel cell vehicles. Fuel gas is supplied to fuel cells by injectors in such fuel cell systems.

Since the requested amount of fuel gas to the fuel cell changes depending on driving situations, there is a need to control the flow amount and so forth of the fuel gas supplied in accordance with the situation. For example, Japanese Patent Application Publication No. 2008-146923 (JP 2008-146923 A) discloses technology in which the operation frequency of the injector is adjusted in accordance with the operating state of the fuel cell, and the supply pressure of fuel gas is appropriately changed.

On the other hand, there are cases in which operation of the injector generates operation sound thereof, giving the operator an unnatural sensation. Accordingly, JP 2008-146923 A describes adjusting pressure in accordance with the operation state, to reduce the amount of fuel gas supplied by the injector when the load is small, such as when idling or traveling downhill, for example, so that the operation sound of the injector does not bother the operator.

Also, Japanese Patent Application Publication No. 2007-194189 (JP 2007-194189 A) describes performing injection by the injector at an injection flow amount no larger than a predetermined injection flow amount when the requested generation amount of the fuel cell is no more than a predetermined generation amount, such as when idling, and setting the driving frequency of the injector in accordance with the injection flow amount and the requested flow amount, in order to suppress pulsation generated by driving the injector and also generation of noise due to the pulsation.

SUMMARY

In JP 2008-146923 A and JP 2007-194189 A, the flow amount of fuel gas by the injector is reduced in situations in which the load is small and the driver tends to be bothered by operation sound, such as when idling, in order to suppress noise due to the injector operating. However, reducing the fuel gas flow amount reduces the extent of increase of anode pressure of the fuel cell. The amount of time to reach the anode lower limit pressure (injection command pressure for injector) thus becomes shorter due to anode pressure dropping as a result of cross-leaking after fuel gas injection and so forth, and the number of times of pulsation occurring due to repeatedly performing injection and stopping injection increases. When low-load operations are continued for a long period of time, the number of times of pulsation (number of times of driving the injector) increases. Each time the injector is driven, the regulator is also driven, and accordingly when the number of times of driving the injector increases, the number of times of driving the regulator also increases. Thus, deterioration of these devices progresses more readily, and there is a problem that the frequency of replacing parts increases. Increase in the frequency of replacing parts leads to lower customer satisfaction.

The present application provides a fuel cell system in which the number of times of driving the injector and the regulator can be reduced, and deterioration of these devices can be suppressed.

Upon diligent study, the present inventor has found that the number of times of driving the injector and the regulator can be reduced by injecting a larger flow amount of fuel gas as compared to the conventional flow amount of fuel gas, during low-load operations such as when idling, thereby suppressing deterioration of these devices, and has completed the fuel cell system according to the present disclosure.

That is to say, an aspect of the disclosure relates to a fuel cell system including a fuel cell, a fuel gas supply channel that carries fuel gas to be supplied to the fuel cell, a regulator that is provided to the fuel gas supply channel and that adjusts pressure of the fuel gas, an injector that is provided to the fuel gas supply channel on a downstream side of the regulator and that supplies the fuel gas to the fuel cell, and a controller configured to control the regulator and the injector such that the regulator is driven in conjunction with the injector. The controller compares a fuel gas flow amount necessary for the fuel cell to generate electricity with a predetermined fuel gas flow amount, selects the fuel gas flow amount that is larger, and issues commands to the regulator and the injector. The predetermined fuel gas flow amount is set to be larger than the fuel gas flow amount necessary for the fuel cell to generate the electricity when a generated current or output of the fuel cell is smaller than a predetermined threshold value.

According to the fuel cell system of the present disclosure, the number of times of driving the injector and the regulator can be reduced, thereby suppressing deterioration of these devices.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
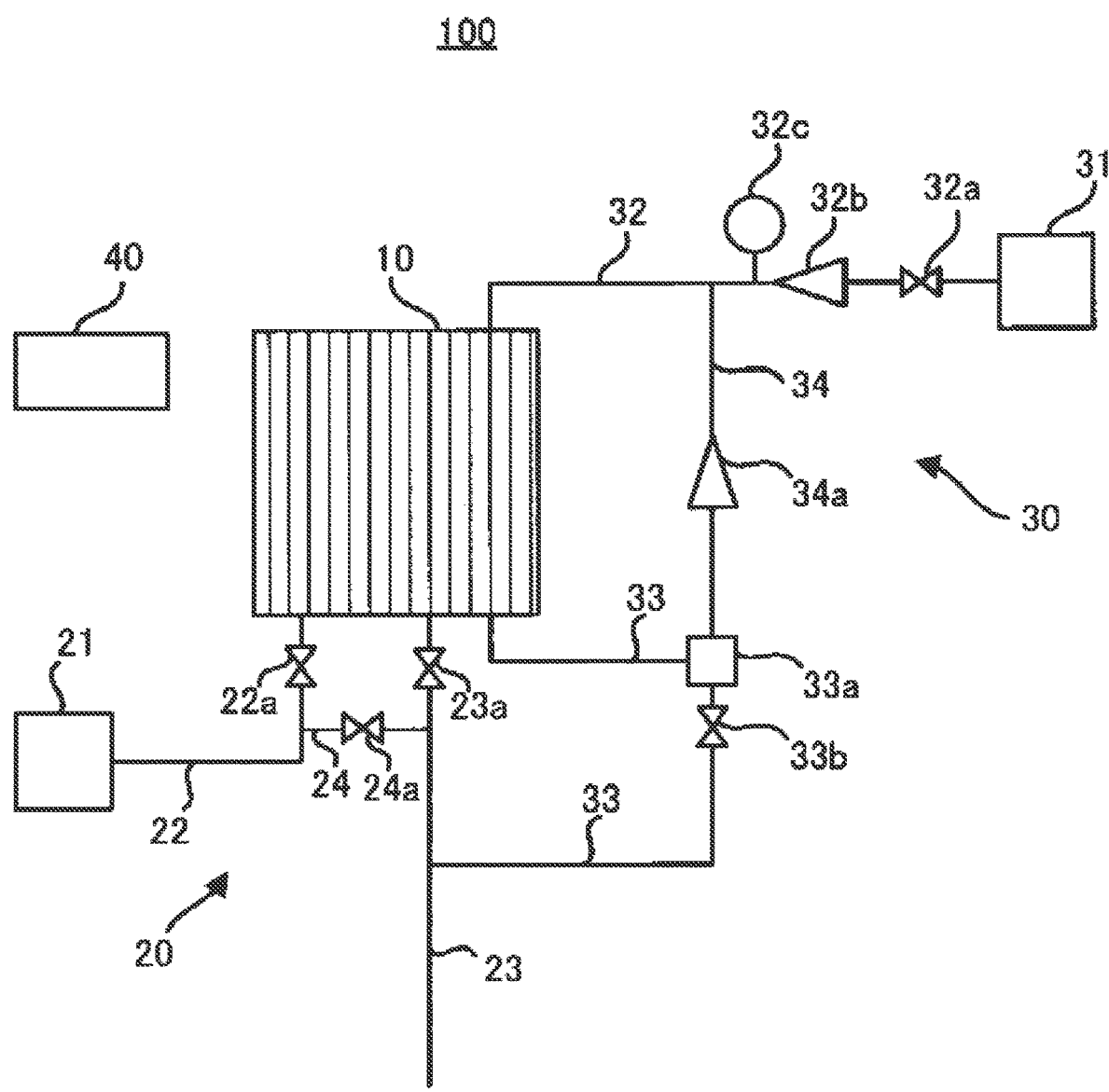
FIG. 1 is a block diagram of a fuel cell system 100.

A fuel cell system according to the present disclosure will be described by way of a fuel cell system 100 that is an embodiment. FIG. 1 is a block diagram of the fuel cell system 100.

The fuel cell system 100 is provided with at least a fuel cell 10, an oxidizing gas piping unit 20, a fuel gas piping unit 30, and a controller 40, as illustrated in FIG. 1. The fuel cell system 100 may also be provided with members commonly provided to fuel cell systems besides these. For example, the fuel cell system 100 may be provided with a cooling channel or the like to cool the fuel cell 10.

Fuel Cell 10

The fuel cell 10 is not limited in particular, and a known fuel cell that can be used in the fuel cell system 100 can be used. Examples include a solid polymer fuel cell that is supplied with an oxidizing gas and a fuel gas, and generates electricity. The fuel cell 10 may have a stacked structure in which a plurality of single cells is stacked. Note that a face on the side to which the oxidizing gas piping unit 20 is connected may be referred to as "air electrode", and a face on the side to which the fuel gas piping unit 30 is connected as "fuel electrode". The oxidizing gas supplied to the fuel cell 10 is consumed by fuel cell reaction at the air electrode, and is discharged from the fuel cell 10 in a wet condition, due to moisture generated by this reaction. The oxidizing gas discharged from the fuel cell 10 in a wet condition is referred to as "oxidization off-gas". In the same way, fuel gas supplied to the fuel cell 10 is consumed by the fuel cell reaction at the fuel electrode, and is discharged from the fuel cell 10 in a wet condition, due to moisture generated by this reaction. The fuel gas discharged from the fuel cell 10 in a wet condition is referred to as "fuel off-gas". Note that the fuel gas is hydrogen gas, for example, and the oxidizing gas is air, for example.

Oxidizing Gas Piping Unit 20

The oxidizing gas piping unit 20 is provided with an oxidizing gas supply unit 21, an oxidizing gas supply channel 22 that is connected to the oxidizing gas supply unit 21 and the fuel cell 10 and that carries oxidizing gas to be supplied to the fuel cell 10, a discharge channel 23 for carrying oxidizing off-gas discharged from the fuel cell 10 to the outside of the system, and a flow dividing channel 24 for connecting the oxidizing gas supply channel 22 and the discharge channel 23, and dividing the flow of oxidizing gas. The oxidizing gas supply unit 21 is for supplying oxidizing gas to the fuel cell 10 via the oxidizing gas supply channel 22. An air pump, for example, can be used as the oxidizing gas supply unit 21. The oxidizing gas supply channel 22 is provided with a sealing valve 22a on a downstream side from the portion where the flow dividing channel 24 is connected, and can control supply of oxidizing gas to the fuel cell 10 by the sealing valve 22a. The discharge channel 23 is provided with a pressure regulating valve 23a on an upstream side from the portion where the flow dividing channel 24 is connected, and controls pressure at the time when discharging the oxidizing off-gas to the outside of the system. The discharge channel 23 is also connected to a later-described fuel off-gas discharge channel 33, on the downstream side from the portion where the flow dividing channel 24 is connected, and fuel off-gas is also discharged to the outside of the system via the discharge channel 23. The flow dividing channel 24 is provided with a flow dividing valve 24a. The flow dividing valve 24a is adjusted as necessary, to carry oxidizing gas from the oxidizing gas supply channel 22 to the discharge channel 23 via the flow dividing channel 24 and adjust the pressure and so forth of the oxidizing gas supply channel 22.

Fuel Gas Piping Unit 30

The fuel gas piping unit 30 is provided with at least a fuel gas supply source 31, a fuel gas supply channel 32, the fuel off-gas discharge channel 33, and a circulation channel 34. The fuel gas piping unit 30 may also be provided with members commonly provided to fuel gas piping units besides these.

The fuel gas supply source 31 is configured of a high-pressure hydrogen tank or a metal hydride alloy or the like, for example, and stores hydrogen gas at a pressure of 35 MPa or 70 MPa, for example. When a shut-off valve, omitted from illustration, is opened, hydrogen gas flows from the fuel gas supply source 31 into the fuel gas supply channel 32. The fuel gas supply source 31 may also be configured of a reformer that generates hydrogen-rich reformed gas from a hydrocarbon fuel, and a high-pressure gas tank that accumulates the reformed gas generated at the reformer in a high-pressure state.

The fuel gas supply channel 32 is a channel for carrying fuel gas to be supplied to the fuel cell 10. One end is connected to the fuel gas supply source 31, and the other end is connected to the fuel cell 10. The fuel gas supply channel 32 is provided with a shut-off valve (omitted from illustration), a regulator 32a, an injector 32b, and a pressure measuring device 32c, from the upstream side (fuel gas supply source 31 side).

The regulator 32a is a device for regulating the pressure of the fuel gas at the upstream side, with this pressure-regulating control being performed by the controller 40. Placing the injector 32b on the downstream side of the regulator 32a enables the pressure on the upstream side of the injector 32b to be effectively lowered.

The injector 32b supplies fuel gas, of which the pressure has been regulated by the regulator 32a, to the fuel cell 10. Specifically, the fuel gas is supplied to the fuel cell 10 by directly driving a valve element provided to the injector 32b by electromagnetic driving force at a predetermined driving cycle, so as to be distanced from a valve seat. At this time, the fuel gas flow amount and gas pressure are controlled by adjusting opening/closing of the valve element. This control is performed by the controller 40. Note that fuel gas supplied from the injector 32b may be mixed with a later-described circulation gas and supplied to the fuel cell 10 in some cases.

Now, when supplying fuel gas to the fuel cell 10, the regulator 32a is also driven in conjunction with driving of the injector 32b, and the fuel gas is regulated to a predetermined pressure. For example, the fuel gas is depressurized to around 200 kPa and supplied to the fuel cell 10.

The pressure measuring device 32c is placed on the downstream side of the injector 32b, and measures injector outlet pressure (anode pressure). When the anode pressure reaches a predetermined command value (injection command pressure), the controller 40 issues a command to the injector 32b to inject fuel gas.

The fuel off-gas discharge channel 33 is a channel for carrying fuel off-gas discharged from the fuel cell 10, with one end connected to the fuel cell 10 and the other end connected to the discharge channel 23. The fuel off-gas carried by the fuel off-gas discharge channel 33 is discharged to the outside of the system via the discharge channel 23. The fuel off-gas discharge channel 33 is provided with a vapor-liquid separator 33a and a vent-drain valve 33b from the upstream side (fuel cell 10 side).

The vapor-liquid separator 33a is for separating the vapor component and the liquid component in the fuel off-gas discharged from the fuel cell 10. The fuel off-gas is fuel gas in a wet condition containing moisture, as described above, and accordingly the vapor component separated by the vapor-liquid separator 33a is primarily fuel gas, and the liquid component is primarily water.

The vent-drain valve 33b is placed on the downstream side of the vapor-liquid separator 33a, and is for controlling discharge of the liquid component separated by the vapor-liquid separator 33a. Opening and closing of the vent-drain valve 33b is controlled by the controller 40. The liquid discharged from the vent-drain valve 33b is sent to the discharge channel 23 along with the vapor component, subjected to predetermined deactivation processing, and thereafter is discharged to the outside of the system.

The circulation channel 34 has one end thereof connected to the fuel gas supply channel 32 at the downstream side of the injector 32b, and has the other end connected to the vapor-liquid separator 33a, and is a channel for carrying the vapor component (circulation gas) separated by the vapor-liquid separator 33a. The circulation gas is supplied to the fuel gas supply channel 32 by a hydrogen pump 34a provided to the circulation channel 34.

Controller 40

The controller 40 controls the entire fuel cell system 100, and controls the oxidizing gas piping unit 20, the fuel gas piping unit 30, and so forth, in accordance with requests, to perform generation of electricity by the fuel cell 10. The controller 40 is a computer configured of a central processing unit (CPU), read-only memory (ROM), random access memory (RAM), and so forth. The controller 40 runs software corresponding to various types of control, and controls the entire fuel cell system 100.

Note that the controller 40 controls the regulator 32a and the injector 32b under predetermined conditions, and adjust the flow amount of fuel gas supplied to the fuel cell 10.

The flow amount of fuel gas that the injector 32b supplies is determined by generation requests to the fuel cell 10, in principle. Accordingly, when the amount of electricity generated by the fuel cell 10 is small, such as when idling or traveling downhill or the like (low-load operations), the flow amount of fuel gas that the injector 32b supplies is also small, and pulsation pressure is also small. On the other hand, when the fuel gas flow amount and pulsation pressure become small, the time of the anode pressure reaching the anode lower-limit pressure (injection command pressure of injector 32b) becomes short due to lowering of anode pressure from cross-leaking and so forth. The number of times of pulsation occurring by repeatedly performing injection and stopping injection of fuel gas by the injector 32b thus increases accordingly. The number of times of driving the regulator 32a that is driven in conjunction with driving the injector 32b also increases. When low-load operations are continued for a long period of time, deterioration of the regulator 32a and the injector 32b progresses more readily, and there is a concern that the frequency of replacing parts of these devices will increase. Increase in the frequency of replacing parts leads to lower customer satisfaction.

Accordingly, in the present embodiment, the controller 40 adjusts the flow amount of fuel gas supplied to the fuel cell 10 by controlling the regulator 32a and the injector 32b under predetermined conditions, in order to reduce the number of times of driving the regulator 32a and the injector 32b. Specifically, the controller 40 compares the fuel gas flow amount necessary for the fuel cell 10 to generate electricity with a predetermined fuel gas flow amount, selects the fuel gas flow amount that is larger, and issues commands to the regulator 32a and the injector 32b.

Figure 2:
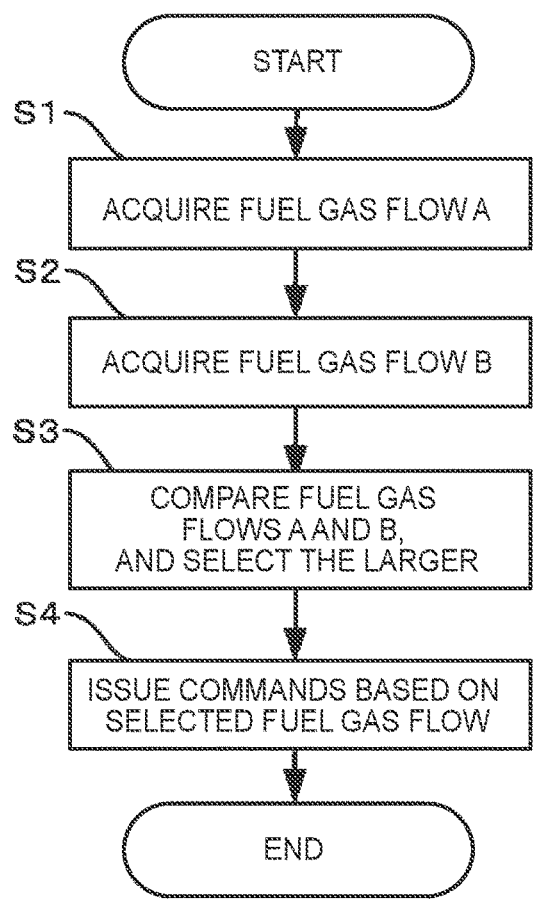
FIG. 2 is an example of a fuel gas flow amount control routine.

An example of a processing routine of this flow amount control is shown in FIG. 2. The fuel gas flow amount control has processing S1 through S4, as illustrated in FIG. 2. Note however, that the order of processing S1 and processing S2 may be reversed.

In processing S1, a fuel gas flow amount A necessary for the fuel cell 10 to generate electricity is acquired. Also, in processing S2, a predetermined fuel gas flow amount B is acquired. Next, in processing S3, the fuel gas flow amounts A and B are compared, and the larger one is selected. Finally in processing S4, commands are issued to the regulator 32a and the injector 32b based on the selected fuel gas flow amount.

Now, the fuel gas flow amount A is the fuel gas flow amount necessary for the fuel cell 10 to generate the electricity calculated from a generation request at the current point in time.

The predetermined fuel gas flow amount B is set to be larger than a fuel gas flow amount C that is necessary for the fuel cell 10 to generate electricity when the generated current or output of the fuel cell 10 is smaller than a predetermined threshold value. The expression "when the generated current or output of the fuel cell 10 is smaller than a predetermined threshold value" means low-load operations, such as when idling or performing regenerative engine braking. That is to say, the predetermined threshold value is a value to differentiate whether the current operating state is a low-load operation state. The predetermined threshold value can be set as appropriate in accordance with the capabilities of the fuel cell system. Also, the expression "a fuel gas flow amount C necessary for the fuel cell 10 to generate electricity when the generated current or output of the fuel cell 10 is smaller than a predetermined threshold value" means the fuel gas flow amount necessary for the fuel cell 10 to generate the electricity calculated from a generation request during low-load operations, and is set as appropriate in accordance with the capabilities of the fuel cell system. An example is the smallest fuel gas flow amount that the injector 32b can supply (fuel gas flow amount to which a minimum injection time is applied). Further, the fuel gas flow amount B is set to be larger than the fuel gas flow amount C, so a relation of fuel gas flow amount B>fuel gas flow amount C is satisfied. Although the upper limit value of the fuel gas flow amount is not limited in particular, the upper limit value is set within a range in which fuel gas leakage or equipment trouble due to the anode pressure being too high does not occur. The fuel gas flow amount B is normally set taking into consideration the durability and part replacement frequency of the regulator 32a and the injector 32b.

The expression "commands are issued to the regulator 32a and the injector 32b based on the selected fuel gas flow amount" means that operating conditions of the regulator 32a and the injector 32b are set based on the fuel gas flow amount selected in processing S3, and commands are issued to the regulator 32a and the injector 32b to drive based on these settings. Operating conditions of the injector 32b are, for example, the number of times of driving the injector 32b, duty ratio, drive cycle, injection time, and so forth, and operating conditions of the regulator 32a are pressure-regulating conditions corresponding to the operating conditions of the injector 32b.

Due to the fuel cell system 100 performing such flow amount control, the number of times of driving the regulator 32a and the injector 32b can be reduced even when low-load operations continue for a long period of time, and deterioration of these devices can be suppressed. Also, reduction in the number of times of driving enables noise, vibrations, and so forth to be reduced. Further, adjusting the fuel gas flow amount enables fuel consumption to be improved. Accordingly, customer satisfaction can be improved by the flow amount control according to the present embodiment.

Figure 3A:
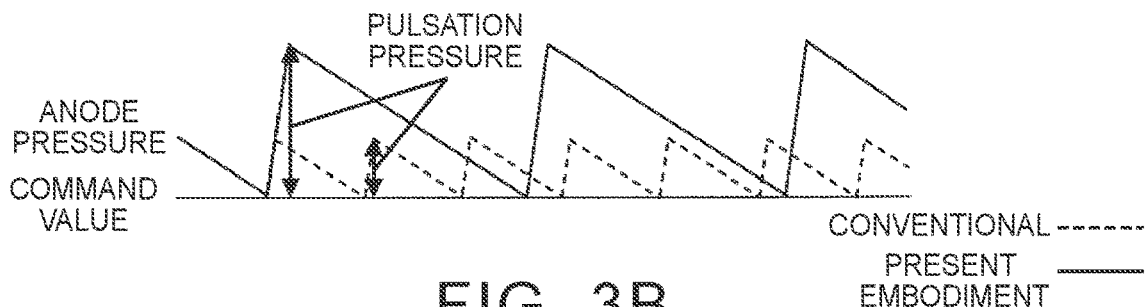
FIG. 3A is a schematic diagram comparing conventional flow amount control during low-load operations and flow amount control according to an embodiment, illustrating injector outlet pressure (anode pressure)
Figure 3B:
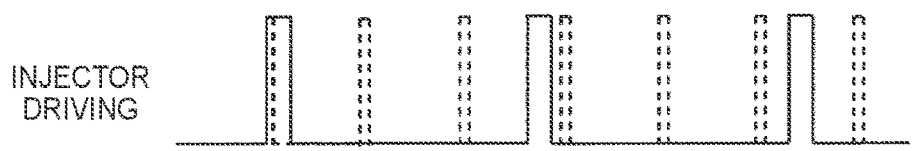
FIG. 3B is a schematic diagram comparing conventional flow amount control during low-load operations and flow amount control according to the embodiment, illustrating injector driving frequency.

This flow amount control will be further described by way of FIGS. 3A and 3B. FIGS. 3A and 3B are schematic diagrams for comparing conventional flow amount control and flow amount control according to the present embodiment, with regard to flow amount control in a low-load state. FIG. 3A shows injector output pressure (anode pressure), and FIG. 3B shows injector drive cycle.

As shown in FIG. 3A, when the anode pressure reaches the command value, the injector is driven and injects a predetermined flow amount. The injected fuel gas flow amount is determined by the injection time of the injector. In FIG. 3B, the drive time of the injector (fuel gas injection time) is short and the fuel gas flow amount is small in the conventional flow amount control, and accordingly the pulsation pressure is small, as illustrated in FIG. 3A. Consequently, the injector is repeatedly driven for short periods due to low anode pressure due to cross-leaking and so forth. On the other hand, the injector drive time is long when performing the flow amount control according to the present embodiment, and the fuel gas flow amount is set to be larger than in the conventional arrangement, and accordingly pulsation pressure is larger. Accordingly, the time until the anode pressure reaches the command value is longer, and the number of times of driving the injector (number of times of driving the regulator) is reduced.

In this way, the flow amount control according to the present embodiment exhibits advantages particularly during low-load operations, and reduces the number of times of driving the injector and regulator by supplying larger amounts of fuel gas instead of supplying a fuel gas flow amount calculated from generation requests to the fuel cell during low-load operations as with conventional arrangements, thereby exhibiting advantages of suppression of deterioration of these devices, and so forth.

Figure 4A:
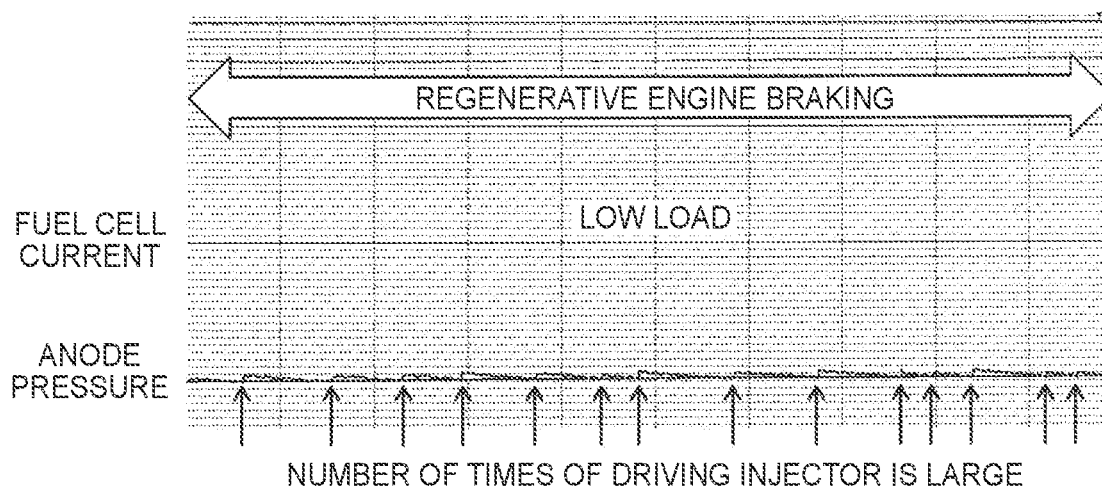
FIG. 4A illustrates conventional flow amount control in a low-load operation state when performing regenerative engine braking.
Figure 4B:
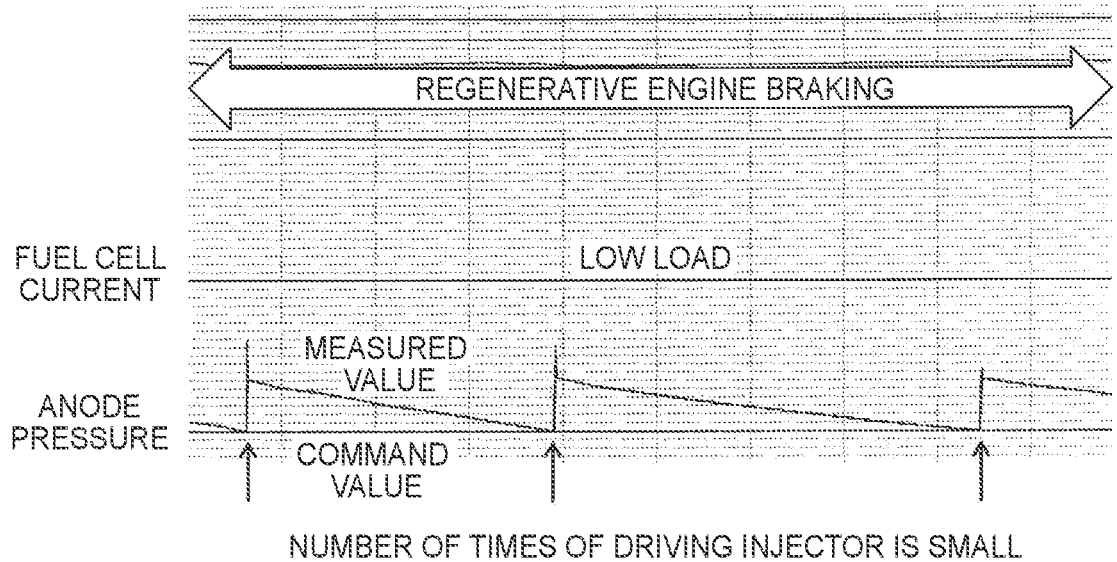
FIG. 4B illustrates flow amount control in a low-load operation state when performing regenerative engine braking according to the embodiment.

In conclusion, FIGS. 4A and 4B show the results of actually comparing flow amount control. FIG. 4A illustrates conventional flow amount control when performing regenerative engine braking, and FIG. 4B illustrates flow amount control according to the present embodiment. It can be seen from FIGS. 4A and 4B that the number of times of driving the injector is larger in the conventional flow amount control, and the number of times of driving the injector is fewer in the flow amount control according to the present embodiment.

The fuel cell system according to the present disclosure has been described above by way of the fuel cell system 100 that is one embodiment. The fuel cell system according to the present disclosure reduces the number of times of driving the injector and regulator by raising the lower limit value of the flow amount as compared to conventional fuel gas flow amount control, enabling to suppress deterioration of these devices. Accordingly, it can be said that the fuel cell system according to the present disclosure is an extremely superb technology in the field of fuel cell vehicles.

What is claimed is:

1. A fuel cell system, comprising:
   a fuel cell;
   a fuel gas supply channel that carries fuel gas to be supplied to the fuel cell;
   a regulator that is provided to the fuel gas supply channel and that adjusts pressure of the fuel gas;
   an injector that is provided to the fuel gas supply channel on a downstream side of the regulator and that supplies the fuel gas to the fuel cell; and
   a controller programmed to control the regulator and the injector such that the regulator is driven in conjunction with the injector,
   wherein the controller is programmed to compare a fuel gas flow amount necessary for the fuel cell to generate electricity with a predetermined fuel gas flow amount, selects the fuel gas flow amount that is larger, and control the regulator and the injector
   such that the predetermined fuel gas flow amount that is larger than the fuel gas flow amount necessary for the fuel cell to generate the electricity calculated from a generation request is injected from the injector, when a generated current or output of the fuel cell is smaller than a predetermined threshold value.

2. The fuel cell system of claim 1, wherein the controller is programmed to increase an injection pressure of the injector, increase a drive time of the injector and increase an injection interval of the injector, when the generated current or the output of the fuel cell is smaller than the predetermined threshold value.

3. A fuel cell vehicle comprising the fuel cell system of claim 1, wherein the controller is programmed to control the regulator and the injector such that the predetermined fuel gas flow that is larger than the fuel gas flow amount necessary for the fuel cell to generate the electricity calculated from the generation request is injected from the injector, when idling or traveling downhill of the fuel cell vehicle.

* * * * *